United States Patent [19]

Lidy

[11] Patent Number: 5,155,142

[45] Date of Patent: Oct. 13, 1992

[54] PROCESS FOR PREPARING POLYUREA OR POLYURETHANE/UREA FOAMS

[75] Inventor: Werner A. Lidy, Collonge-Bellerive, Switzerland

[73] Assignee: BP Chemicals Limited, London, England

[21] Appl. No.: 413,322

[22] Filed: Sep. 27, 1989

[30] Foreign Application Priority Data

Sep. 29, 1988 [GB] United Kingdom ............... 8822916

[51] Int. Cl.$^5$ .................. C08G 18/00; C08G 18/06
[52] U.S. Cl. .................... 521/157; 521/163; 521/167; 528/53; 528/48; 528/76; 528/77; 564/393
[58] Field of Search ......... 521/110, 157, 121, 163, 521/159, 167; 524/723; 528/53, 61, 196, 48, 76, 77; 564/59, 61, 393

[56] References Cited

U.S. PATENT DOCUMENTS

| | | |
|---|---|---|
| 3,256,213 | 6/1966 | Gmittor . |
| 4,136,241 | 1/1979 | Ammann ............... 521/163 |
| 4,645,630 | 2/1987 | Rasshofer et al. ............ 264/54 |
| 4,732,919 | 3/1988 | Grigsby, Jr. et al. ............ 521/159 |
| 4,758,603 | 7/1988 | Carswell ............... 521/110 |
| 4,931,487 | 6/1990 | Priester, Jr. et al. ............ 521/163 |
| 4,959,499 | 9/1990 | Harris ............... 528/196 |

FOREIGN PATENT DOCUMENTS 1534236 11/1978 United Kingdom .
2075530 11/1981 United Kingdom .

*Primary Examiner*—Morton Foelak
*Assistant Examiner*—Duc Truong
*Attorney, Agent, or Firm*—Brooks Haidt Haffner & Delahunty

[57] ABSTRACT

A process for preparing polyurea or polyurethane/urea foams from a polyamine or aminated polyether polyol is provided. The process comprises reacting the above component with a polyisocyanate (e.g. TDI, MDI etc.), a blowing agent (e.g. water) and a carboxylic acid or carboxylate acid salt. The function of the carboxylic acid or carboxylic acid salt is to slow down the reaction between the amine and the isocyanate so that effective foaming can take place before the reaction is completed.

5 Claims, No Drawings

PROCESS FOR PREPARING POLYUREA OR POLYURETHANE/UREA FOAMS

The present invention relates to the manufacture of a polyurea or a polyurethane/urea foam from a polyisocyanate and either a partially or fully aminated polyether polyol.

U.S. Pat. No. 3,838,706 discloses the manufacture of polyurethane/urea foams from partially aminated polyether polyols. Typically the process described uses polyether polyols having a functionality in the range 2 to 8, an equivalent weight in the range 900 to 2800 and between 15 and 55% by weight terminal amino groups (the balance being terminal hydroxyl groups). Using such a process polyurethane foams can be made at reaction rates comparable with conventional polyether polyols.

GB 2103226 teaches the use of a carboxylic acid or a carboxylic acid salt to produce a blowing action in the manufacture of polyurethane foam by reaction with isocyanate.

A problem encountered when using partially or fully aminated polyether polyols is that they react so quickly with isocyanate that it is not possible to produce a foamed product before reaction is complete. This has limited the industrial exploitation of such compounds in foam technology. This problem therefore needs to be solved before partially or fully aminated polyether polyols can be used in foam manufacture.

According to the present invention there is provided a process for making a polyurea or a polyurethane/urea foam which process comprises reacting a polyisocyanate with respectively either a polyamine or a fully or partially aminated polyether polyol in the presence of a blowing agent characterised in that the process is carried out in the presence of a carboxylic acid or carboxylic acid salt.

The present invention solves the problem defined above by using a carboxylic acid or carboxylic acid salt in conjunction with the partially or fully aminated polyether polyol. The carboxylic acid or carboxylic acid salt has the effect of slowing down the rate of reaction between the aminated polyether polyol and the polyisocyanate thereby allowing foaming to take place before the reaction is completed. In particular, for fully aminated polyether polyols and polyamines, the present invention allows foams to be made in a controlled manner.

The carboxylic acid or carboxylic acid salt is or is derived from preferably a $C_1$ to $C_4$ carboxylic acid. Most preferred are either formic or acetic acid. Polycarboxylic acids e.g. oxalic acid and succinic acidcan also be used. Examples of carboxylic acid salts, include the carboxylic acid salts of protonated or quaternised $C_1$ to $C_6$ mono, di- and trialkylamines. It is possible to generate the carboxylic acid salt in situ under the conditions of the reaction by using appropriate precursors.

The amount of carboxylic acid or salt used will depend upon such factors as the degree to which the polyether polyol is aminated, the desired rate of reaction and the like. For most practical purposes a molar ratio of carboxylic acid or carboxylic acid salt to polyamine or aminated polyether polyol in the range 0.5 to 3.5 is likely to be suitable.

The polyisocyanates which can be used in the process of the present invention will be familiar to those skilled in the polyurethane art and comprise all those compounds which can be used in the manufacture of polyurethanes. Whilst this means that, in principle, any di or polyfunctional alkyl or aryl isocyanates can be used, preference is given to those which are most often used industrially in the manufacture of polyurethane foam, i.e. the isomers of toluene diisocyanate (TDI) and di(4-isocyantophenyl) methane or oligomers thereof (known in the art as MDI). Mixtures of TDI and MDI can also be used as can prepolymers of TDI and/or MDI with polyether or polyester polyols. Suitable materials are described for example in U.S. Pat. No. 4,463,107 and similar patents.

The polyether amines which can be used are suitably those prepared by fully or partially aminating a polyether polyol. Such precursor polyether polyols, which include species having either mainly primary or mainly secondary hydroxyl groups, are will known and are prepared by adding molecules of one or more alkylene oxides to a suitable initiator. Examples are given in U.S. Pat. No. 3,838,076. The initiator can be for example a low molecular weight alcohol or amine having up to 10 carbon atoms. Suitable initiators include ethylene glycol, propylene glycol, glycerol, trimethylolpropane, sorbitol and other sugars. It is preferred that the initiator has at least three reactive hydrogen.

The alkylene oxides used to prepare the precursor polyether polyol are suitably $C_2$ to $C_4$ alkylene oxides, preferably ethylene oxide, propylene oxide or mixtures thereof.

The precursor polyether polyol to be aminated suitably has a molecular weight from about 900 to about 2500 and a hydroxyl number in the range 400 to 15.

The aminated polyether polyols of the present invention may be prepared as described in U.S. Pat. No. 3,838,076 i.e. by contacting a suitable polyether polyol with ammonia in the presence of a hydrogenation/dehydrogenation catalyst. Using this technique it is possible to prepare either fully or partially aminated polyether polyols having either or both primary and/or secondary amine groups. Typically, the extent of amination of the polyether polyol is between 10 and 100% of the stoichiometric amount.

As an alternative to aminated polyether polyols it is possible to use polyamines, e.g. poly(ethylene diamine), which have a molecular weight in the range 900 to 2500.

The process of the present invention is carried out by mixing appropriate amounts of the polyisocyanate, polyamine or aminated polyether polyol and the carboxylic acid or carboxylic acid salt. The process which produces the polyurea or polyurethane/urea is catalysed by base, hence it is necessary to have a base present. In the case of aminated polyether polyols having secondary amine groups however, there is sufficient catalytic activity associated with the aminated polyether polyol to make the addition of an amine catalyst unnecessary and therefore optional. Hence, it is possible to carry out the process either in the absence of a catalyst or in the presence of a catalyst of low reactivity, e.g. a tin or titanium catalyst. In the case of aminated polyether polyols having primary amine groups however, it is necessary to have an amine catalyst (e.g. tetraethylenediamine or an alkanolamine) present in order to ensure that curing of the product takes place properly.

If an amine catalyst is to be used, then the molar ratio of carboxylic acid or carboxylic acid salt to amine catalyst is preferably in the range 0.3 to 1.5, most preferably in the range 0.5 to 1.0.

In addition to the components described above, a blowing agent such as water, a permanent gas or a fluorocarbon is used to create a foam.

The skilled man will be aware that in addition one or more ancillary components may be added when operating the process of the present invention. These include surfactants, foam stabilisers, flame retardants, crosslinkers, fillers, pigments and the like. Such materials will be well known to the skilled man as will the amounts of each which would be required to produce the desired effect.

The invention is now illustrated with reference to the following Examples.

EXAMPLE 1

The following components were formulated in a mould by blending with a drill press:

|  | p.b.w. |
| --- | --- |
| Polyether amine 11087 (ex BP Chemicals) | 100 |
| Formic acid | 4.15 |
| Water | 3 |
| Stannous octoate (catalyst) | 0.2 |
| SC 154 (silicone stabiliser ex BP Chemicals) | 1.0 |
| Toluene diisocyanate | 52 |

The formulation had a cream time of 4 secs and produced a non-sticky foam having a density of 22 $gl^{-1}$.

COMPARATIVE TEST A

Example 1 was repeated with the difference that the formic acid was omitted. The formulation creamed and reacted so quickly that no foam could be produced.

EXAMPLE 2

The following components were formulated in a mould by blending with a drill press:

|  | p.b.w. |
| --- | --- |
| Jeffamine T 500 (polyether amine-ex Texaco) | 100 |
| Formic acid | 2.8 |
| Water | 3 |
| Dimethylethanolamine (Catalyst) | 2 |
| Stannous octoate | 0.2 |
| SC 154 (silicone surfactant ex BP Chemicals) | 1.0 |
| Toluene Diisocyanate | 45 |

The formulation had a cream time of 5 secs and cured to produce a non-sticky foam. (Jeffamine is a Texaco Trade Mark).

COMPARATIVE TEST B

Example 2 was repeated except that the dimethylethanolamine was omitted. The formulation creamed and reacted but the foam remained sticky at the end indicating that it had not cured properly.

I claim:

1. A process for making a polyurea or a polyurethane/polyurea foam which comprises reacting a polyisocyanate with respectively either a polyamine or a fully or partially aminated polyether polyol in the presence of a blowing agent characterised in that the process is carried out in the presence of $C_1$-$C_4$ a carboxylic acid or the carboxylic acid salt of a quaternized or protonated $C_1$ to $C_6$ mono-, di, or trialkylamine.

2. A process as claimed in claim 1 characterised in that the carboxylic acid is selected from formic acid, acetic acid, oxalic acid and succinic acid.

3. A process as claimed in claim 1 characterised in that the molar ratio of carboxylic acid or carboxylic acid salt to polyamine or fully or partially aminated polyether polyol is in the range 0.5 to 3.5.

4. A process as claimed in claim 1 characterised in that the polyamine is a polyethylene diamine having a molecular weight in the range 900 to 2500.

5. A process as claimed in claim 1 characterised in that (1) the aminated polyether polyol has primary amine groups and (2) the process is carried out in the presence of an effective amount of an amine catalyst to cure the product.

* * * * *

UNITED STATES PATENT AND TRADEMARK OFFICE
CERTIFICATE OF CORRECTION

PATENT NO. : 5,155,142
DATED : October 13, 1992
INVENTOR(S) : WERNER A. LIDY

It is certified that error appears in the above-identified patent and that said Letters Patent is hereby corrected as shown below:

Column 4, line 28 (claim 1, line 8), "di" should read -- di- --.

Signed and Sealed this

Second Day of November, 1993

Attest:

Attesting Officer

BRUCE LEHMAN

Commissioner of Patents and Trademarks